United States Patent [19]

Alford

[11] Patent Number: 5,704,737
[45] Date of Patent: Jan. 6, 1998

[54] CUTTING INSERT WITH CHIP CONTROL

[75] Inventor: David B. Alford, Wake Forest, N.C.

[73] Assignee: Kennametal Inc., Latrobe, Pa.

[21] Appl. No.: 425,511

[22] Filed: Apr. 20, 1995

[51] Int. Cl.$^6$ ............................................... B23B 27/22
[52] U.S. Cl. ........................... 407/114; 407/116; 407/117
[58] Field of Search ............................ 407/117, 115, 407/100, 114, 116

[56] References Cited

U.S. PATENT DOCUMENTS

| | | | |
|---|---|---|---|
| D. 306,032 | 2/1990 | Mihic | D15/139 |
| 4,834,592 | 5/1989 | Niebauer et al. | 407/100 X |
| 4,957,396 | 9/1990 | Niebauer | 407/114 |
| 4,969,779 | 11/1990 | Barten | 407/117 X |
| 4,992,008 | 2/1991 | Pano | 407/115 |
| 5,088,862 | 2/1992 | Niebauer et al. | 407/116 X |
| 5,282,703 | 2/1994 | Itaba et al. | 407/114 |
| 5,375,948 | 12/1994 | Lindstedt | 407/116 |
| 5,411,354 | 5/1995 | Gustaffson | 407/110 |

FOREIGN PATENT DOCUMENTS

| | | |
|---|---|---|
| 0138498 | 4/1985 | European Pat. Off. . |
| 0616867 | 9/1994 | European Pat. Off. . |
| 3819415 | 12/1989 | Germany . |
| 2204815 | 11/1988 | United Kingdom . |

*Primary Examiner*—Andrea L. Pitts
*Assistant Examiner*—Henry W.H. Tsai
*Attorney, Agent, or Firm*—John J. Prizzi; James G. Porcelli

[57] ABSTRACT

A cutting insert for grooving operations with chip control features having an insert body with peripheral walls, sides and first and second end walls to define cutting edges within cutting edge regions and adapted for mounting in a pocket of a toolholder assembly. A land extends rearwardly from the end wall and defines a width. A descending wall initiates in the land and terminates in a floor having a forward, a rearward and opposed side edges. A back ramp extends upwardly from the floor rearward edge and terminates at the respective peripheral wall to define a cavity. A pair of projections extend longitudinally along the sides of the cavity to promote chip control and intersect with diagonal side ramps rearward of the cavity. The side ramps may be used to provide a chamfer on the edges of the machined groove.

1 Claim, 4 Drawing Sheets

CUTTING INSERT WITH CHIP CONTROL

FIELD OF THE INVENTION

The invention is directed to cutting inserts, especially metal cutting inserts with chip control.

BACKGROUND OF THE INVENTION

Cutting inserts are well known and a large percentage of them are of the throw away design. Such inserts are detachably clamped on a holder and then are discarded when they become dull or chipped. Throw away inserts are usually indexable so that an insert can be provided with at least two cutting edges for selective presentation to the cutting position. An indexable insert having multiple cutting edges is more economical because when one edge has been used, the insert may simply be indexed to the next usable edge. Such a feature is especially important when considering the high cost of materials from which inserts are produced.

In general, inserts must be securely and accurately held in place within an insert holder during the cutting operation. This is especially true when the inserts are deployed with numerically controlled machines which depend for accuracy upon an accurately located and firmly supported insert. When the inserts are large enough, it is possible to secure the insert both accurately and firmly within the pocket of a toolholder by providing the insert with a central hole and the toolholder with a pin-type clamping device. In other cases, such inserts may be held in place by a top clamp. Examples of such holders are found in U.S. Pat. Nos. 3,754,309; 3,399,442 and 3,762,005 and British Patent Specification 1,363,542.

The main object of metal machining is the shaping of the new work surface. Much attention is paid to the formation of the chip during the machining process, even though the chip is a waste product, because the consumption of energy occurs mainly in the formation and movement of the chip. Thus an essential feature of any metalcutting operation is effective chip control. A principal class of chips is the discontinuous chip which has the practical advantage of being easily cleared from the cutting area. While some metals and alloys generate discontinuous chips during cutting operations, many do not. It is therefore very desirable to produce discontinuous chips during a cutting operation, regardless of the workpiece material.

It has been a common practice to place a mechanical chip breaking member between the insert and the clamp securing the insert to the tool in order to provide at least a degree of chip control during the cutting operation. In certain situations, this may be undesirable because of the difficulty of clamping a shim, the insert and the chip breaking member together.

Because chip control is an important consideration in metal cutting operations, it has been a long standing objective in the art of metal cutting to develop improved chip breaking members for use with cutting inserts. One example of a cutting insert with chip breaking capabilities is the cut-grip inserts "GIP" available from ISCAR. The ISCAR insert has a land with a pair of generally parallel, elongated and elevated members which deform the metal chips as they are removed from the workpiece. Another example of a cutting insert with features designed to provide chip control is the Econ-o-grove insert manufactured by Valenite Corporation. This insert has parallel side walls extending along a continuous descending wall, floor and back wall of constant radius. Another example of a cutting insert with a chipbreaker style is commercially available from Sandvik and is characterized by a non-continuous front face which may not provide a flat finish to the cut groove in a workpiece.

U.S. Pat. No. 5,032,050 issued Jul. 16,1991 teaches a cutting insert having a cavity positioned behind the cutting edge for chip control. However, when the cutting edge is much wider than the width of the cavity, the part of the workpiece material contacted by the cutting edge is not influenced by the cavity. This patent is assigned to the Applicant and is hereby incorporated by reference.

It is an object of the invention to provide an insert with improved chip control characteristics.

It is another object of this invention to provide an improved chip control insert configured to cooperate with a clamping element of an insert toolholder.

It is still another object of this invention to provide an insert for grooving operations in which the width of the cutting edge may be grooved to a desired width and the insert will retain effective chip control capability.

It is yet another object of this invention to provide an insert for grooving operations that is capable of providing a chamfer finish.

SUMMARY OF THE INVENTION

The invention provides a cutting insert with a unique configuration that results in improved chip control. This cutting insert comprises an insert body having cutting edge regions and sides and at least two peripheral walls substantially perpendicular to the sides. The peripheral walls may be used as seating surfaces to secure the insert within a toolholder. The insert body is adapted for mounting in a holder with one cutting edge region exposed. The insert body is indexable about an axis perpendicular to the sides thereof and the insert body has cutting edges at the cutting edge regions, whereby in each indexed position of the insert body a respective cutting edge is presented.

The peripheral walls of the insert body may define a diagonal notch, which extends across the surfaces at an angle such that each notch forms substantially the same angle with the sides of the insert.

Each of the cutting edge regions of the insert defines at least in part a cutting edge for presentation to a workpiece. A primary land extends rearwardly from the cutting edge region toward the respective peripheral wall and defines a surface region of a predetermined width and area. A secondary land extends downwardly from the primary land. A descending wall initiates in a portion of the secondary land and terminates in a floor to define a cavity. The descending wall terminates at the forward and side edges of the floor and a back ramp extends upwardly from the floor edge and terminates at the respective peripheral wall.

Protruding from the privacy land at both sides of the cavity are longitudinal projections which begin rearwardly of the cutting edge and terminate at side ramps extending diagonally from the back ramp of the cavity.

In an alternative embodiment, the primary land may be expanded to define a desired cutting edge width thereby providing a range of widths for the cutting edge as wide as the insert body and as narrow as the combined width of the cavity and adjacent projections.

BRIEF DESCRIPTION OF THE DRAWINGS

The above as well as other features and advantages of the invention will become apparent through consideration of the detailed description in connection with the several drawings in which.

DETAILED DESCRIPTION OF THE INVENTION

Figure 1:
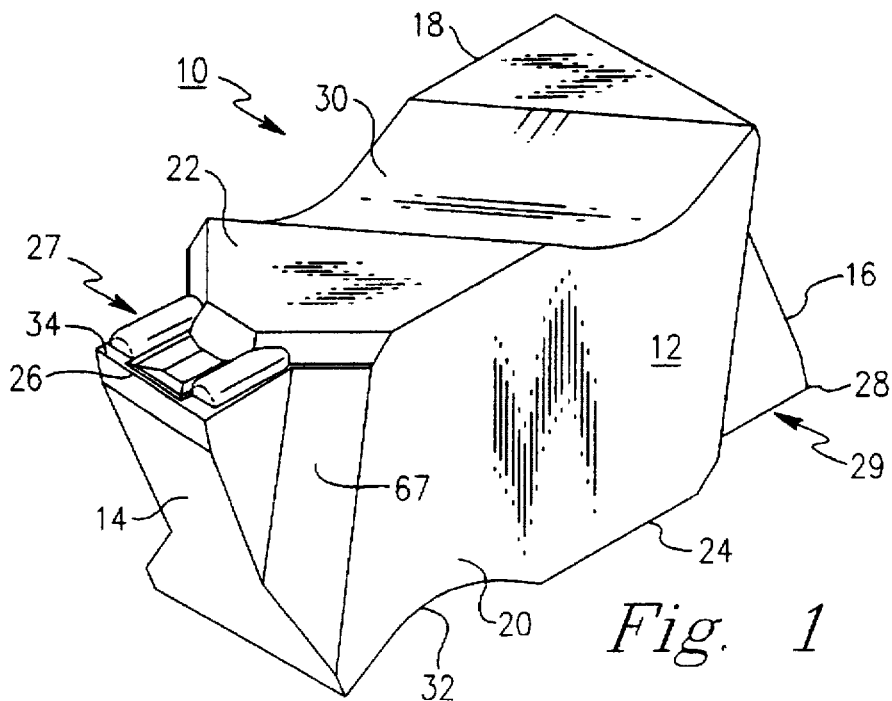
FIG. 1 is an isometric view of a cutting insert configured for chip control, all according to the present invention.

A cutting insert with chip control features is shown in FIG. 1 and generally indicated by the reference character 10. The insert 10 comprises an insert body 12 having a first end wall 14, a second opposed end wall 16, first and second sides 18 and 20 and first and second peripheral walls 22 and 24. The insert body 12 may be made from a hard cemented carbide such as tungsten, titanium carbide, tungsten titanium carbide or TiC-TiN. At the juncture of one end wall 14 and the first peripheral wall 22 there is a cutting edge 26 within a cutting edge region 27. At the juncture of the other end wall 16 and the second peripheral wall 24 there is a second cutting edge 28 within a cutting edge region 29.

The insert body 12 of the insert 10 may be formed with a diagonal notch 30 in the first wall 22 and a diagonal notch 32 in the second wall 24 of the insert. Each notch 30 and 32 may be "V" shaped in cross section and adapted for engagement by the toolholder assembly, which will be described below. With the insert configuration as described above, in each indexed position of the insert body 12, a respective cutting edge is presented uppermost at the same location on the toolholder. The diagonal notches 30 and 32 extending across the insert body 12 are disposed at an angle such that each notch, when uppermost, forms substantially the same angle with the sides 18 and 20 of the insert body 12. Also, in each indexed position, the insert body 12 presents a cutting edge region 26 or 28 to a workpiece.

It should be noted the insert body 12 of this invention is indexable and therefore the detailed features described in conjunction with one cutting edge region of the insert are present within the other cutting edge region. Therefore, only the cutting edge region 27 and those insert portions directly related to this cutting edge region will hereafter be discussed.

Figure 3:
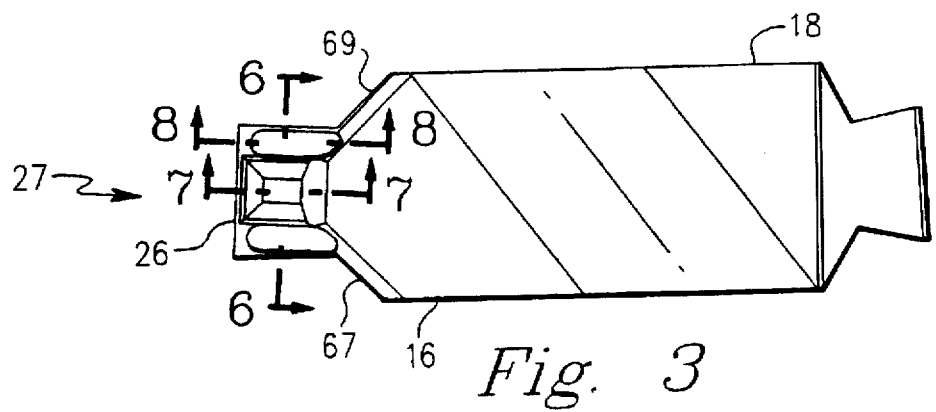
FIG. 3 is a plan view of a cutting insert of this invention shown in FIG. 1.
Figure 4:
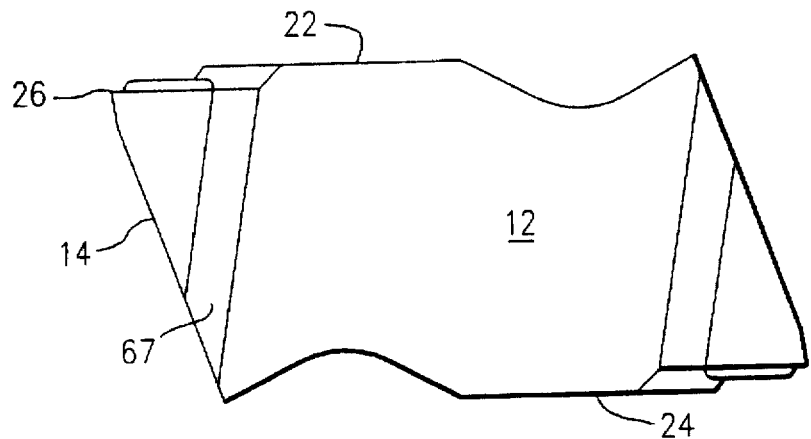
FIG. 4 is a side view of an insert of this invention shown in FIG. 1.
Figure 5:
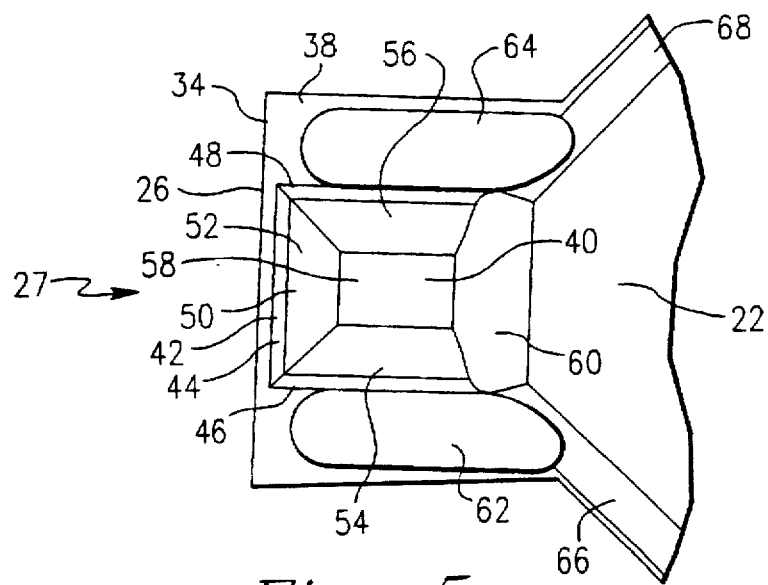
FIG. 5 is a an enlarged fragment plan view illustrating the cutting edge region of the insert of FIG. 1.

As can be seen more clearly through FIGS. 3, 4 and 5 in conjunction with FIG. 1, the insert body 12 includes in the cutting edge region 27 a primary land 34 extending rearwardly from the end wall 14 toward the first wall 22. The primary land 34 defines a surface 38 of a predetermined width and area. The cutting edge region 27 extends rearwardly and tapers outwardly to meet the sides 16 and 18 of the insert body 12. Additionally, the cutting edge region 27 extend downwardly from the cutting edge 26 to meet the peripheral wall 24.

Within the confines of the primary land 34 is a cavity 40 initiated from the primary land 34 by a secondary land 42.

The secondary land 42 extends from the primary land 34 to the edge of the cavity 40 and has a front section 44 and two side sections 46 and 48. The cavity 40 is comprised of a descending wall 50 having a front section 52 and two side sections 54 and 56 which each descend to a floor 58, which may be planar. The floor 58 extends rearwardly to a back ramp 60 which ascends to the peripheral wall 22. On each side of the cavity 40 is found a longitudinal projection 62 and 64. Each projection 62 and 64 protrudes from the primary land 34 beginning at a location behind the cutting edge 26 and extends rearwardly to intersect with side ramps 66 and 68 extending along the tapered portion of the cutting edge region 27 from the primary land 34 to the peripheral wall 22. Transition surfaces 67 and 69 connect the ramps 66 and 68 with the end wall 14 and additionally provide clearance to permit the use of the insert for deep grooving. It should be appreciated that the transition surfaces 67 and 69 could be oriented to provide additional clearance if necessary.

Figure 6:
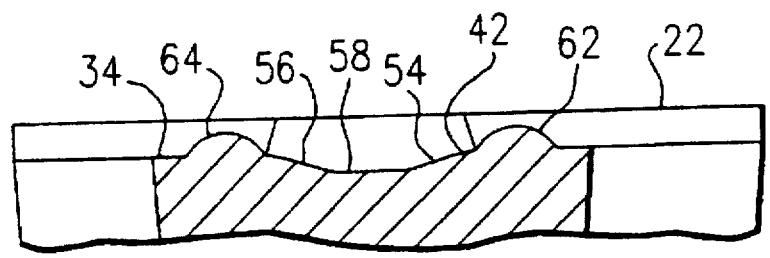
FIG. 6 is a section along lines 6—6 of FIG. 3.
Figure 7:
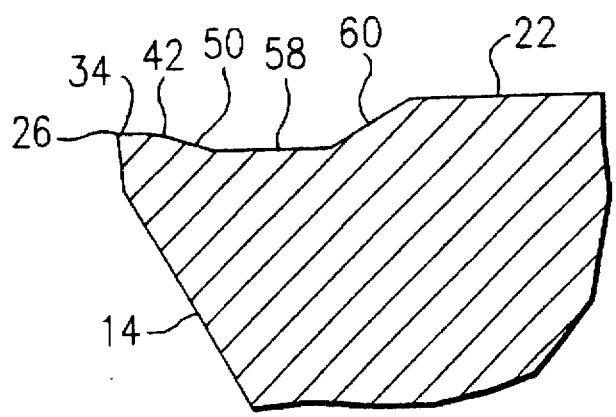
FIG. 7 is a section along lines 7—7 of FIG. 3.
Figure 8:
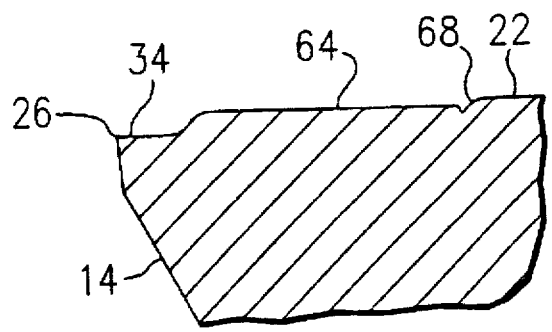
FIG. 8 is a section along line 8—8 of FIG. 3.

As can be seen from FIGS. 6, 7 and 8, the primary land 34 is approximately parallel with the peripheral wall 22. On the other hand, the secondary land 42 slopes downwardly toward the cavity floor 50 at an angle of approximately 5 to 15 degrees and preferably about 10 degrees. Also, as seen from FIG. 7, the cutting edge 26 is at a lower elevation than the peripheral wall 22 to protect the cutting edge 26 when mounted in a toolholder in an unused position.

From FIGS. 6, 7 and 8, it may also be seen that the descending wall 50 descends from the secondary land 42 at an angle of approximately 15 to 21 degrees and preferably 18 degrees with respect to the peripheral wall 22. Furthermore, the back ramp 60 ascends from the floor 58 toward the peripheral wall 22 at an angle of approximately 30 to 50 degrees and preferably about 40 degrees with respect to the peripheral wall. As can be seen from FIG. 6, the side sections 54 and 56 of the descending wall 50 descend from the secondary land 42 toward the floor 58 at an angle of about 15 to 21 degrees and preferably at an angle of about 18 degrees with respect to the peripheral wall 22.

It should be noted that the side sections 46 and 48 of the secondary land 42 descend slightly toward the cavity floor 40. It is believed the lack of such a descending angle would not adversely effect the performance of this insert. However, the descending angle is believed to contribute to a reduction in cutting forces and therefore it is a preferable future. Additionally, it should be noted that the primary land 34 is parallel with the peripheral wall 22. Again, while an angle such as that of the secondary land 42 would be preferred, the lack of such an angle will only marginally effect the insert performance.

Each projection 62 and 64 extends from the primary land 34 to form an arc which may have a radius of curvature of about 0.005 inches. It is important that the projections 62 and 64 direct material into the cavity 40 and therefore shapes other than an arc, such as a triangle or angled surface, may be appropriate. Additionally, it should be noted that the primary land 34 and secondary land 42 could be one continuous surface having a single flat land such as primary land 34 extending to the descending wall 50 of the cavity 40 or both may have a single flat land having a slight incline as the secondary land 42 now has. The advantage provided by the flat surface of the primary land 34 is the width of the cutting edge 26 may be adjusted by fabricating a relatively large cutting edge 26 having a wide primary land 34 and then grinding the land 34 to a desired width. In this fashion, the flat primary land 34 provides greater versatility for the final insert configuration. As a general rule, the combined width of the cavity 40 and projections 62 and 64 should be less than or equal to one third the width of the cutting edge 26.

The insert of the present invention is intended for grooving operations. In this respect, upon entering a workpiece, the cutting edge 26 penetrates the workpiece and material is deflected rearwardly toward the cavity 40. One of the goals of the present design is to direct as much material as possible toward the cavity 40, where under light feed, the material will come off the primary land 34 and secondary land 42 and strike the back ramp 60 causing the material to break into chips of a desirable size. In the alternative, the material could turn back upon itself to break and create chips.

Under a heavier feel rate, the breakage would be caused by a combination of the chip striking the floor 58 and the back ramp 60 as well as the chip turning back on itself. Chips formed by contact with the cavity 40 tend to be generally "U" shaped in cross section and therefore more rigid and breakable than chip without such cavity influence. If the insert is plunged to a depth where the side ramps 66 and 68 contact the workpiece, then the insert will impart upon the workpiece a chamfer. In the process, the insert will remove burrs that existed at the workpiece edge before the chamfer was imparted.

The projections 62 and 64 provide a unique feature to the invention by increasing the effective area of the cavity 40. Specifically, that portion of the workpiece contacted by the cutting edge 26 on either side of the cavity 40 will be subjected to the influence of the projections 62 and 64. For that material on the inner half of each projection, that is, the side facing the cavity 40, the material will be deflected inwardly toward the cavity 40. On the other hand, the material contacting the outer half of the projections 62 and 64 will tend to be separated from that material contacting the inner half of the projections, thereby promoting breakup of the material. Although shown in the figures as extending back to the side ramps 66 and 68, the projections 62 and 64 may also be effective if each extended back only as far as the back ramp 60.

Figure 2:
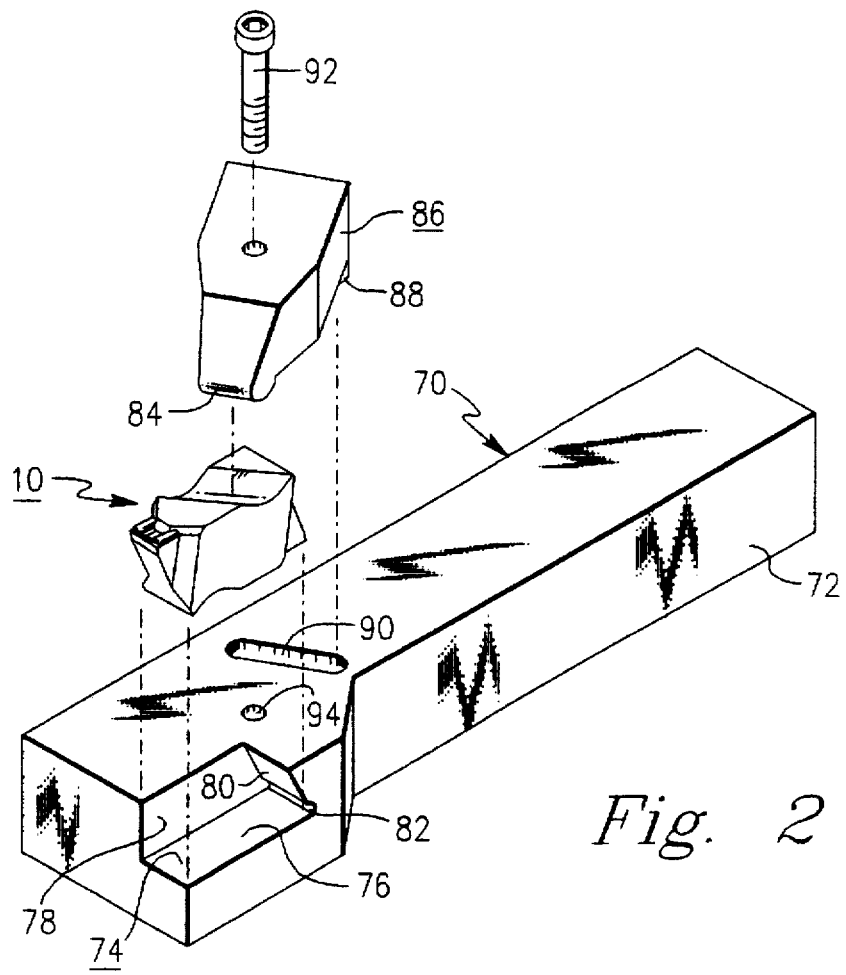
FIG. 2 is an exploded perspective view illustrating a typical holder and clamping arrangement for use in combination with one cutting insert of this invention.

Turning now to FIG. 2, there is shown a toolholder 70 which is ideally suited for use in combination with the insert 10 of this invention. The toolholder 70 is in the form of a bar-like steel member 72 adapted for being clamped in a tool support of any suitable type. At one end of the member 72 there is an insert pocket 74 having a bottom wall 76, a side wall 78 and a back wall 80. Advantageously, an undercut is provided at the juncture of the bottom and back walls as indicated at 82 in order to protect the cutting edge 26, 28 of the insert 10 which is disposed in that region in each clamped position of the insert 10.

It will be noted that bottom and side walls 76 and 78 of the pocket 74 are at right angles to each other whereas the back wall 80 may be at a right angle to side wall 78 but converges with bottom wall 76 in the direction toward the back of the pocket. This pocket 74 is adapted for receiving an insert 10 therein. As described above, the insert 10 may be provided with "V" shaped notches 30 and 32. These grooves 30 and 32 are adapted for engagement by the rounded nose 84 on the one end of one leg of a clamp member 86 which is in the form of an inverted "U" shaped member.

Clamping member 86 has a further leg 88 adapted for being received in a recess 90 formed in the top of the holder 70. A clamp screw 92 extends through a hole in the clamp member 86 between the legs thereof and into a threaded hole 94 provided in the top wall of the holder.

When the insert is placed in the pocket, the clamp member is put in position, and screw 92 is tightened, and the insert is pressed firmly against the bottom wall 76 of the pocket while simultaneously being drawn toward walls 78 and 80. The insert is thus securely clamped in the pocket in the holder and is accurately located therein by being forced against the side walls of the pocket.

The side wall 78 of the pocket is preferably at a slight angle, approximately about 3 degrees, to the longitudinal axis of the holder 70. For this reason, the opposite ends of the insert are shaped in such a manner as to compensate for the small angularity of the wall 78 to the longitudinal axis of the holder 70.

A more detailed description of this as well as several other clamping arrangements and toolholders which can be advantageously utilized with the subject cutting insert can be had through a review of U.S. Pat. No. 3,754,309, entitled "Cutting Insert and Clamping Arrangement Therefor," which patent is assigned to the assignee of the present invention and incorporated by reference herein.

Figure 9:
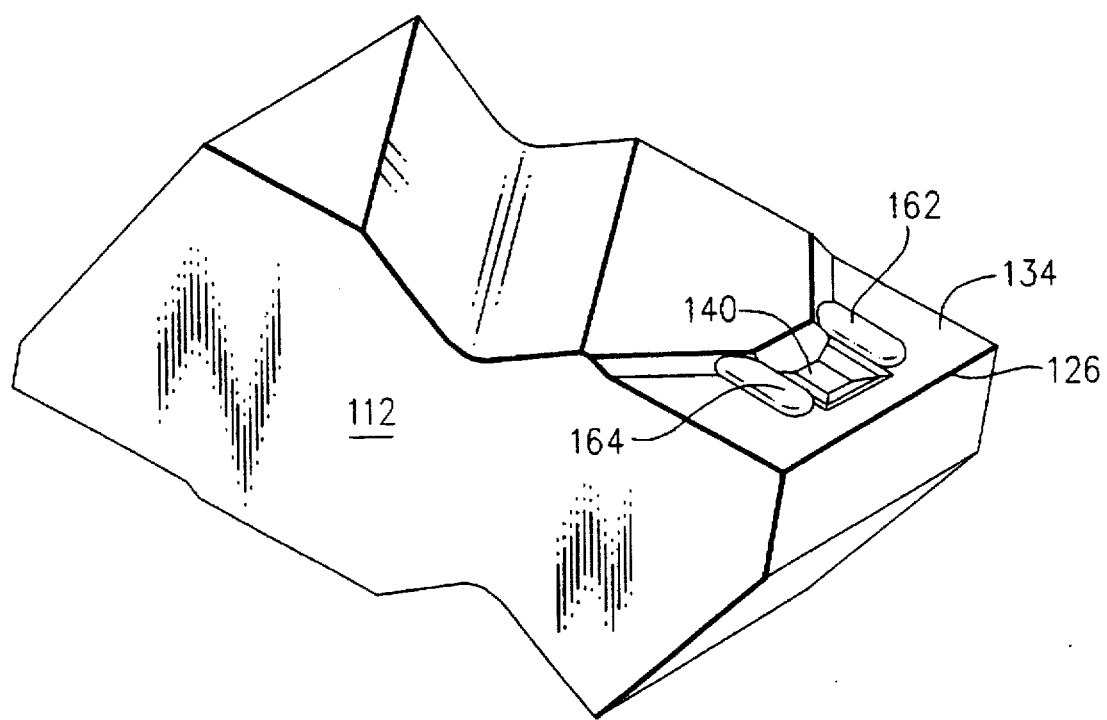
FIG. 9 is an embodiment of the subject invention in which the land is expanded to provide a cutting edge as wide as the insert body.

The width of the cutting edge 26 shown so far has been such that the projections 66 and 68 and the cavity 60 occupy essentially all of the cutting region 27 behind the cutting edge 26. While such a design is preferable, it is possible to provide an insert having an expanded primary land so that the width of the cutting edge may be increased. FIG. 9 shows such a configuration. The design is identical to that of the earlier embodiment except the primary land 134 has been expanded and the width of the cutting edge 126 is the same as the width of the insert body 112. It should be appreciated that while the expanded land will in conjunction with the cutting edge 126 provide cutting action, the most efficient cutting action will occur in the area of the projections 162 and 164 and the cavity 140. In light of this, it is possible to vary the width of the cutting edge 126 from a maximum of that shown in FIG. 9 to that shown in FIG. 1.

Finally, it should be noted that the subject invention is directed toward chip control features and it is only for convenience that such features are shown on the insert body illustrated herein. It is entirely possible to utilize the chip control features shown in the cutting edge region 27 of the subject invention on an insert having another shape, such as a triangular insert in which the cutting edge is located at each of the three end edges and the chip control features are located behind each cutting edge. Therefore, it should be obvious that these chip control features may be applicable to a variety of other cutting insert configurations for grooving operations.

Fabrication of the cutting inserts described in this application may be accomplished utilizing conventional pill pressing techniques coupled with EDM (Electrical Discharge Machining) or may be fabricated using injection molding techniques, both of which are known to a person of ordinary skill in the art. One such technique for thermoplastic molding of a sinterable silicon carbide composition may be found in U.S. Pat. No. 4,551,496, entitled "Thermoplastic Molding of Sinterable Silicon Carbide."

It has been found that a metal cutting insert incorporating the chip control features described herein provides significantly improved chip control over a wide variety of metal-cutting conditions.

What is claimed is:

1. A cutting insert with chip control features comprising an insert body having
   a) first and second generally parallel sides;
   b) peripheral walls between and generally perpendicular to said sides with at least one pair of adjacent peripheral walls forming an included angle of 90 degrees or less with one another;

c) at least one cutting edge region, each region having a predetermined width and located at a juncture of a pair of adjacent peripheral walls forming an included angle of 90 degrees or less with each other, each cutting edge region comprising i) a cutting edge at the juncture of the pair of adjacent peripheral walls;

ii) a land extending rearwardly along one of the pair of adjacent peripheral walls from the cutting edge and defining a width;

iii) a descending wall having a forward portion and opposed side portions, initiating in the land and terminating in a floor having a forward, a rearward and opposed side edges wherein said descending wall terminates at said floor's forward and opposed side edges;

iv) a back ramp ascending from said floor rearward edge, intersecting said descending wall opposed side portions and terminating at said land thereby defining a cavity;

v) a pair of side ramps initiating at the land and extending up and back to a peripheral wall, each side ramp further extending diagonally from the cutting edge region to the outermost width of the insert body; and vi) a pair of longitudinal projections protruding from the land and located on each side of the cavity extending rearwardly to each of the side ramps;

wherein said insert body is adapted for mounting in a holder with one cutting edge positioned in the holder for cutting operations.

* * * * *